US008433923B2

(12) United States Patent
Yasaki et al.

(10) Patent No.: US 8,433,923 B2
(45) Date of Patent: Apr. 30, 2013

(54) INFORMATION PROCESSING DEVICE HAVING ACTIVATION VERIFICATION FUNCTION

(75) Inventors: Kouichi Yasaki, Kawasaki (JP); Isamu Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1284 days.

(21) Appl. No.: 11/484,698

(22) Filed: Jul. 12, 2006

(65) Prior Publication Data
US 2007/0226518 A1 Sep. 27, 2007

(30) Foreign Application Priority Data
Mar. 22, 2006 (JP) .................................. 2006-079472

(51) Int. Cl.
*G06F 21/00* (2006.01)

(52) U.S. Cl.
USPC .................. 713/187; 726/17; 726/20; 726/22

(58) Field of Classification Search .................. 713/187; 726/17, 20, 22
See application file for complete search history.

(56) References Cited

U.S. PATENT DOCUMENTS

| | | | | |
|---|---|---|---|---|
| 5,421,006 A * | 5/1995 | Jablon et al. ...................... 714/36 |
| 7,137,004 B2 * | 11/2006 | England et al. ............... 713/176 |
| 7,308,571 B2 * | 12/2007 | Barragy et al. ............... 713/100 |
| 7,313,822 B2 * | 12/2007 | Ben-Itzhak ...................... 726/24 |
| 7,360,253 B2 * | 4/2008 | Frank et al. ...................... 726/34 |
| 7,379,918 B2 * | 5/2008 | Tan et al. .......................... 705/59 |
| 7,434,259 B2 * | 10/2008 | Hofmeister et al. ............. 726/22 |
| 7,539,868 B2 * | 5/2009 | Balard et al. .................. 713/176 |
| 7,552,326 B2 * | 6/2009 | Liu et al. ......................... 713/164 |
| 7,565,553 B2 * | 7/2009 | Hunter et al. .................. 713/192 |
| 7,613,930 B2 * | 11/2009 | Dotan ............................. 713/188 |
| 7,669,242 B2 * | 2/2010 | Sahita et al. ..................... 726/22 |
| 7,698,562 B2 * | 4/2010 | Kusudo et al. ................. 713/181 |
| 7,921,286 B2 * | 4/2011 | Wooten ........................ 713/164 |
| 7,953,980 B2 * | 5/2011 | Schluessler et al. .......... 713/176 |
| 8,032,942 B2 * | 10/2011 | Smith et al. ...................... 726/27 |
| 8,190,916 B1 * | 5/2012 | Wang et al. .................... 713/193 |
| 2003/0110372 A1 * | 6/2003 | Proudler ........................ 713/150 |
| 2005/0108564 A1 * | 5/2005 | Freeman et al. ............... 713/200 |
| 2005/0114266 A1 * | 5/2005 | Satkunanathan et al. ....... 705/59 |
| 2005/0132031 A1 * | 6/2005 | Sailer et al. .................... 709/223 |
| 2005/0132122 A1 * | 6/2005 | Rozas ............................. 711/100 |
| 2005/0138393 A1 * | 6/2005 | Challener et al. ............. 713/186 |

(Continued)

FOREIGN PATENT DOCUMENTS

JP 10-333902 12/1998
JP 2004-280284 10/2004

*Primary Examiner* — Edan Orgad
*Assistant Examiner* — James Turchen
(74) *Attorney, Agent, or Firm* — Staas & Halsey LLP

(57) ABSTRACT

An information processing device having an activation verification function comprises: a module recording portion which stores plural system programs, a security chip having the function of checking the validity of the system programs and a verification portion which inspects the activation states of the system programs. The security chip executes validity checking processing using verification data provided by the system programs. If the security chip cannot confirm the validity of the system programs, the verification portion acquires activation-state information about activated system programs from the activated system programs. If pre-stored verification-information initial values for valid system programs and the acquired activation-state information match with each other, the verification portion determines that the current activation states of the system programs are valid, and the subsequent activation processing for the system programs is advanced.

6 Claims, 13 Drawing Sheets

U.S. PATENT DOCUMENTS

| | | | |
|---|---|---|---|
| 2006/0015746 A1* | 1/2006 | Kusudo et al. | 713/187 |
| 2006/0155988 A1* | 7/2006 | Hunter et al. | 713/164 |
| 2006/0212407 A1* | 9/2006 | Lyon | 705/71 |
| 2008/0178257 A1* | 7/2008 | Mishina et al. | 726/2 |

* cited by examiner

FIG.3

VERIFICATION-INFORMATION INITIAL VALUE TABLE S0

| SYSTEM PROGRAM NAME | HASH VALUE HS | PCR |
|---|---|---|
| CRTM | AF07945CB64 | 0 |
| BIOS | BC4897A10BA | 0 |
| OS | 72A3EC750AA | 1 |
| RESULT OF BIOS PASSWORD AUTHENTICATION | CB60981DB29 | 1 |
| VIDEO BIOS | 92BD5A25C97 | 2 |
| ....... | | |

| PUBLIC KEY KEY2 |
|---|

| PASSWORD PS1 |
|---|

FIG.4

ACTIVATION-STATE INFORMATION DB

| | SYSTEM PROGRAM NAME | PASS/FAIL RESULT | PCR |
|---|---|---|---|
| 1 | INITIALIZATION ROUTINE | ○ | 0 |
| 2 | VIDEO BIOS | ○ | 0 |
| 3 | LIST OF CONNECTED DEVICES | ○ | 1 |
| 4 | RESULT OF BIOS PASSWORD AUTHENTICATION | ○ | 1 |
| 5 | KBC ERROR PROCESSING ROUTINE | ○ | 2 |
| | ........ | | |

INFORMATION PROCESSING DEVICE HAVING ACTIVATION VERIFICATION FUNCTION

CROSS-REFERENCE TO RELATED APPLICATIONS

This application is related to Japanese application No. 2006-079472 filed on Mar. 22, 2006, whose priority is claimed under 35 USC §119, the disclosure of which is incorporated by reference in its entirety.

BACKGROUND OF THE INVENTION

1. Field of the Invention

The present invention relates to an information processing device, and more particularly, to an information processing device having an activation verification function of checking the validity of system programs which are activated at power-on of the personal computer or the like and preventing error detections of invalid programs and the like.

2. Description of the Related Art

Currently, there have been the problems of corruption of programs and data and illegal outflow of important data, due to malevolent software such as computer viruses and spyware.

In order to realize a safe computer system against such malevolent software, there has been suggested a computer system which detects the existence of invalid software, falsification of files and the like, during the activation of the computer.

For example, there has been suggested a method for detecting falsification of programs using a coding technique called digital signature.

Also, there has been suggested a compute system having a falsification detecting function of reading specific stored information stored in a secondary storage device and to-be-inspected files without using OSs and detecting the presence or absence of falsification of the files using information stored in a boot program, during the activation of the boot program (see Japanese Unexamined Patent Publication No. 2004-280284).

Further, there has been suggested a control processor which pre-stores a hash-value table including reference hash values for to-be-activated system modules at a secure state and makes comparisons between hash values determined by checking the activated system module programs being activated and the reference hash values for correctly performing software authentication processing at a secure state (see Japanese Unexamined Patent Publication No. HEI 10 (1998)-333902).

Further, there has been suggested a computer system incorporating a security chip called a TPM chip (Trusted Platform Module), in order to authenticate the existence of invalid software and the presence and absence of valid authorities.

The computer system is a personal computer (TCG-compliant personal computer) which conforms to a specification defined by the TCG (Trusted Computing Group). Further, the TPM chip is hardware having the function of checking information (hash values) provided by system programs being actually activated in a successive manner for verifying whether or not only valid software and system programs have been activated without addition of an invalid system program or falsification the system programs.

FIG. 13 illustrates an explanation view of conventional verification processing which is executed during the activation of an information processing device. Here, only main portions of the device are illustrated.

In general, in a computer such as a personal computer, certain system programs are activated in a constant order, just after power-on thereof.

At first, a program called CRTM (Core Root Trust Measurement) is activated and, then, a BIOS (Basic Input Output System) program is activated to check various types of hardware, an Option ROM, an IPL (Initial Program Loader) and the like. Then, an OS (operating system) program is activated.

The TPM chip pre-stores authentication data (an authenticated hash value HS1) for use in checking the validity of the system programs and an activation key KEY1 for use in activation of the OS.

In a TCG-compliant personal computer, a predetermined measurement calculation is performed every time the system programs are activated and the result of the calculation (a hash value) is provided to the TPM chip.

For example, when the CRTM program is activated, the CRTM program executes a measurement calculation for the CRTM program itself and provides data A, which is the result of the calculation (a hash value), to the TPM chip. The TPM chip temporarily stores the provided calculation result (data A).

Next, when the BIOS program is activated, the CRTM program executes a measurement calculation for the BIOS program and provides the result of the calculation (data B) to the TPM chip. The TPM chip creates a new hash value using the provided calculation result and the hash value of the CRTM (the previously-stored hash value) and overwrites it. Thereafter, the BIOS program itself is executed to check the hardware and the like and the OS is activated.

When the OS is activated, a measurement calculation is executed for the OS program and then the result of the calculation (data C) is provided to the TPM chip. The TPM chip overwrites the provided calculation result (hash value: data C) similarly to described above.

Thereafter, the TPM chip makes a comparison between the hash value (data C) resulted from the calculations and the pre-stored authentication hash value HS1. If the comparison processing reveals that both the hash values do not match with each other, it is determined that the activation is abnormal, but if they match, then it is determined that the activation is normal. For example, if an unexpected invalid program is activated, this causes mismatch among the hash values and, accordingly, it is determined that the activation is abnormal.

If it is determined that the activation is abnormal, then the TPM chip provides the pre-stored activation key KEY1 to the OS program. On receiving the activation key KEY1, the OS program executes decoding processing on the HDD, using the key, to activate application programs which operate on the OS. Thereafter, the user is enables to perform operations using the personal computer.

On the other hand, if the aforementioned comparison processing reveals that the hash values do not match with each other, the TPM chip does not output the activation key to the OS program. In this case, the OS program cannot receive the activation key and cannot execute the subsequent activation processing, which prevents the user from using the personal computer.

Namely, in the event of the existence of an unexpected invalid program (for example, computer virus), the activation key is prevented from being output from the TPM chip, which enables detection of invalid programs.

However, with the activation controlling using a conventional TPM chip and the activation controlling described in the aforementioned patent documents, it is possible to detect invalid programs, but even if valid activation processing is activated and invalid program is not existed, it is often determined that the activation is invalid, which may prevent the personal computer from being activated.

For example, if the user changes the BIOS setting, if an external device is newly connected through an interface such as an USB, if a memory (SRAM) is newly mounted, if the order of activation of the system programs is changed and the like, the hash value resulted from the aforementioned measurement calculations will be changed.

In such cases, a hash value different from the authentication hash value pre-stored in the TPM chip is output to the TPM chip. Consequently, the comparison processing by the TPM chip reveals that both the hash value do not match with each other and, thus, it is determined that the activation is abnormal.

Namely, even though there exists no invalid program, it is erroneously determined that abnormal activation has been performed due to the existence of an invalid program or the like, which prevents the activation key from being provided to the OS, thereby preventing the user from using the personal computer.

In the event that the personal computer is made unusable as described above, it is possible to notify the user of the fact of the failure of authentication during activation, but the user has the difficulty of identifying whether or not the personal computer was actually made unusable due to the existence of an invalid program.

Furthermore, in order to search for a cause, the user is required to make an attempt to perform re-activation through power-off, recovery of the hardware, restoration to the previous hardware which enabled normal operations, password inputting processing for unlocking the activation key, and the like.

Namely, with a TCG-compliant personal computer equipped with a conventional TPM chip, it is possible to detect the existence of invalid programs for enhancing the security, but even if there is no invalid program, the personal computer should be restored to a normal activation state through user's operations, which requires a long time period, thereby the usability for users is reduced.

SUMMARY OF THE INVENTION

The present invention provides an information processing device having an activation verification function, the device including: a module recording portion which stores plural system programs; a security chip having the function of checking the validity of the system programs; and a verification portion which inspects the activation states of the system programs, wherein the verification portion includes: an activation-state checking portion for checking the activation states of activated system programs; an activation-state information recording portion which stores information about the activation states of the system programs which has been acquired from the checking of the activation states; an initial-value recording portion which stores verification-information initial values for to-be-activated system programs; and a comparison portion for making a comparison between the information about the activation states of the system programs which was acquired when the respective system programs were activated and have been stored in the activation-state information recording portion and the verification-information initial values which are stored in the initial-value recording portion for inspecting the activation states of the system programs, and if the security chip cannot confirm the validity of the system programs, the verification portion performs inspection of the activation states of the system programs and, if the inspection succeeds, determines that the current activation states of the system programs are valid.

In this invention, there is provided the verification portion for inspecting the validity of the activation states of system programs, separately from the security chip, which enables inspection of the activation states of the system programs even if the security chip has not confirmed the validity thereof and, if the activation of the system programs can be permitted, the activation processing for the system programs can be advanced. Namely, even if the security chip has not confirmed the validity, in the case where the activation of the system programs is valid, the information processing device can be restored without involving user's restoration processing, thereby reducing the burden on the user during the restoration processing at the activation.

BRIEF DESCRIPTION OF THE DRAWINGS

FIG. 3 is an explanation view of verification-information initial values in the information processing device according to the present invention;

FIG. 4 is an explanation view of an activation-state information DB in the information processing device according to the present invention;

DETAILED DESCRIPTION OF THE PREFERRED EMBODIMENTS

Figure 1:
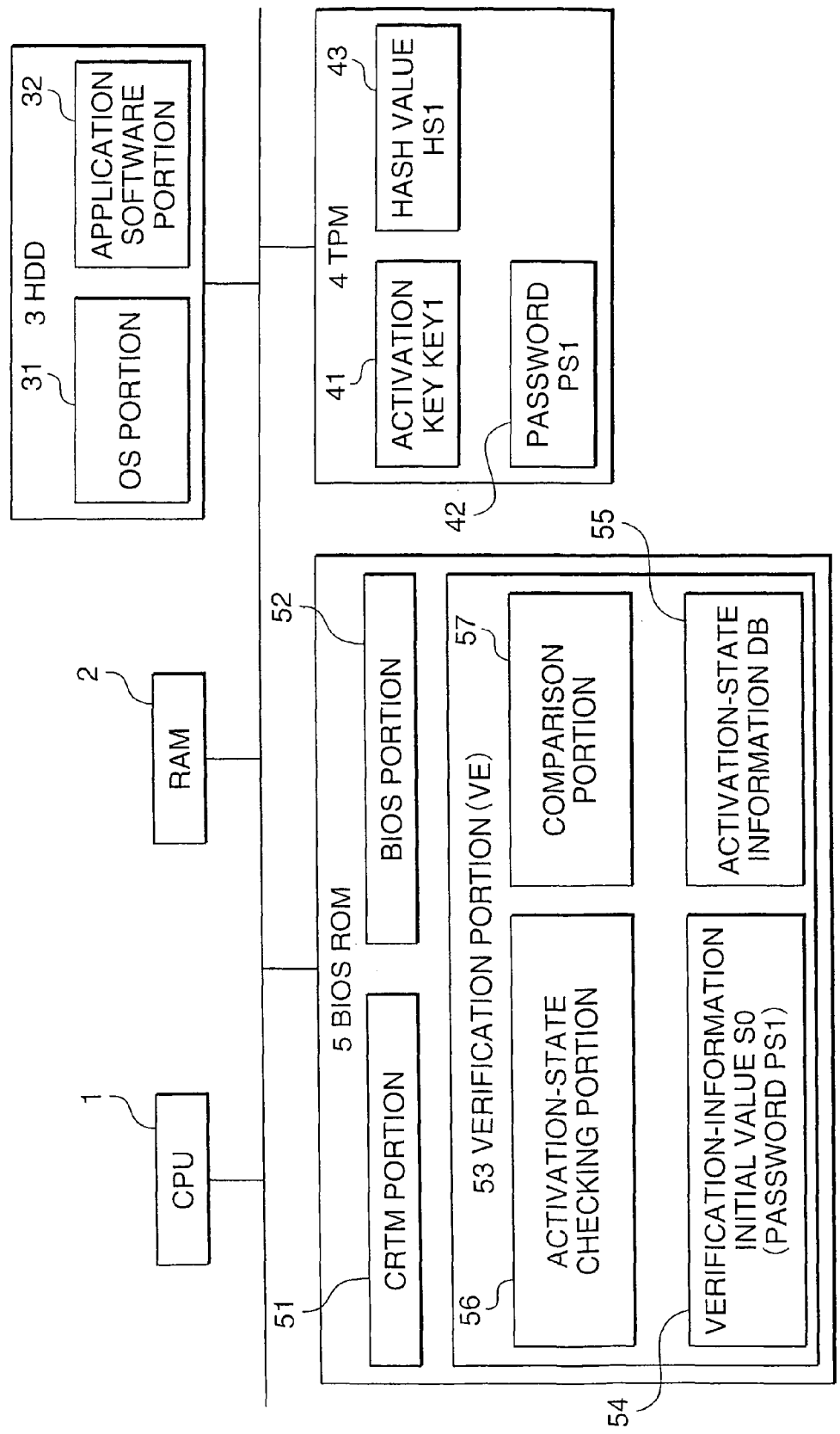
FIG. 1 is a block diagram of the structure of an example of an information processing device according to the present invention.

The present invention is an information processing device having an activation verification function which is capable of detecting the existence of invalid programs, permitting the activation of system programs if the activation processing is expected normal activation processing and enabling automatic restoration without involving user's operations, thereby enhancing the usability for users.

Further, the security chip pre-stores verification information for use in checking the validity of the system programs, and the verification information includes an activation key KEY1, a password PS1 for use in outputting the activation key, and certain verification data for use in verification of the system programs.

Moreover, the security chip receives verification data A provided by a system program when the system program is activated, and makes a comparison between the verification data A and the pre-stored verification data to check the validity of the system program.

Furthermore, in the present invention, the verification portion pre-stores a password PS2 identical to the password PS1 for use in outputting the activation key KEY1 in the initial-value recording portion of, and if the inspection by the comparison portion reveals that the acquired information about the activation states and the verification-information initial values pre-stored in the initial-value recording portion match with each other, the verification portion transmits the pre-stored password PS2 to the security chip, and, if the security chip receives the password PS2, the security chip outputs the pre-stored activation key KEY1 to the verification portion.

According to the above structure, even when the verification by the security chip has failed, if the inspection by the verification portion succeeds, it is determined that the verification of the activation of the system programs has succeeded, and the device can be restored without requiring user's restoration processing, thereby reducing the burden on the user.

In the present invention, the verification portion may be pre-stored in a nonvolatile memory which stores BIOS. In this case, the verification portion is realized as a program, and the function of the verification portion is executed by a CPU provided for the device.

The verification portion may also be provided on a substrate which is equipped with the security chip.

Preferably, this verification portion is realized by hardware and the substrate is mounted in such a manner that it cannot be easily detached.

Further, the present invention provides an information processing device having an activation verification function, the device including: a module recording portion which stores plural system programs; a security chip having the function of checking the validity of the system programs; and a verification portion which inspects the activation states of the system programs, wherein the security chip executes validity checking processing using verification data provided by the system programs, if the security chip cannot confirm the validity of the system programs, the verification portion acquires activation-state information about activated system programs from the activated system programs, and if pre-stored verification-information initial values for valid system programs and the acquired activation-state information match with each other, the verification portion determines that the current activation states of the system programs are valid, and the subsequent activation processing for the system programs is advanced.

The module recording portion according to the present invention is a memory which pre-stores system programs and set values required for the activation of the system programs. For example, a BIOS ROM corresponds to the module recording portion.

The system programs according to the present invention include a group of module programs for use in activating the information processing device and programs such as operating systems (OS) necessary for operating user's application programs. For example, programs included in a CRTM portion, a BIOS portion, an OS portion and the like, which will be described later, correspond to the system programs.

The security chip refers to, for example, a TPM chip and is a chip including a CPU, a ROM, a RAM, a nonvolatile memory and the like.

Further, the verification data stored in the security chip is stored in the nonvolatile memory and can be rewritten through a request for specific control. The certain verification data for use in checking the validity of a system program is provided by the system program and is a hash value calculated from the system program itself.

The information about the activation states of system programs refers to information stored in an activation-state information DB (55) as illustrated in FIG. 4 which will be described later and is created every time the information processing device is activated. For example, if the hardware structure of the device is changed by newly mounting a memory or an interface board, the activation-state information is updated.

The initial-value recording portion corresponds to a verification-information initial value table SO as illustrated in FIG. 3 which will be described later.

Hereinafter, the present invention will be described in detail, on the basis of examples illustrated in the drawings. However, the present invention is not intended to be restricted by these examples.

(The Block Diagram of the Structure of an Information Processing Device According to the Present Invention)

Figure 2:
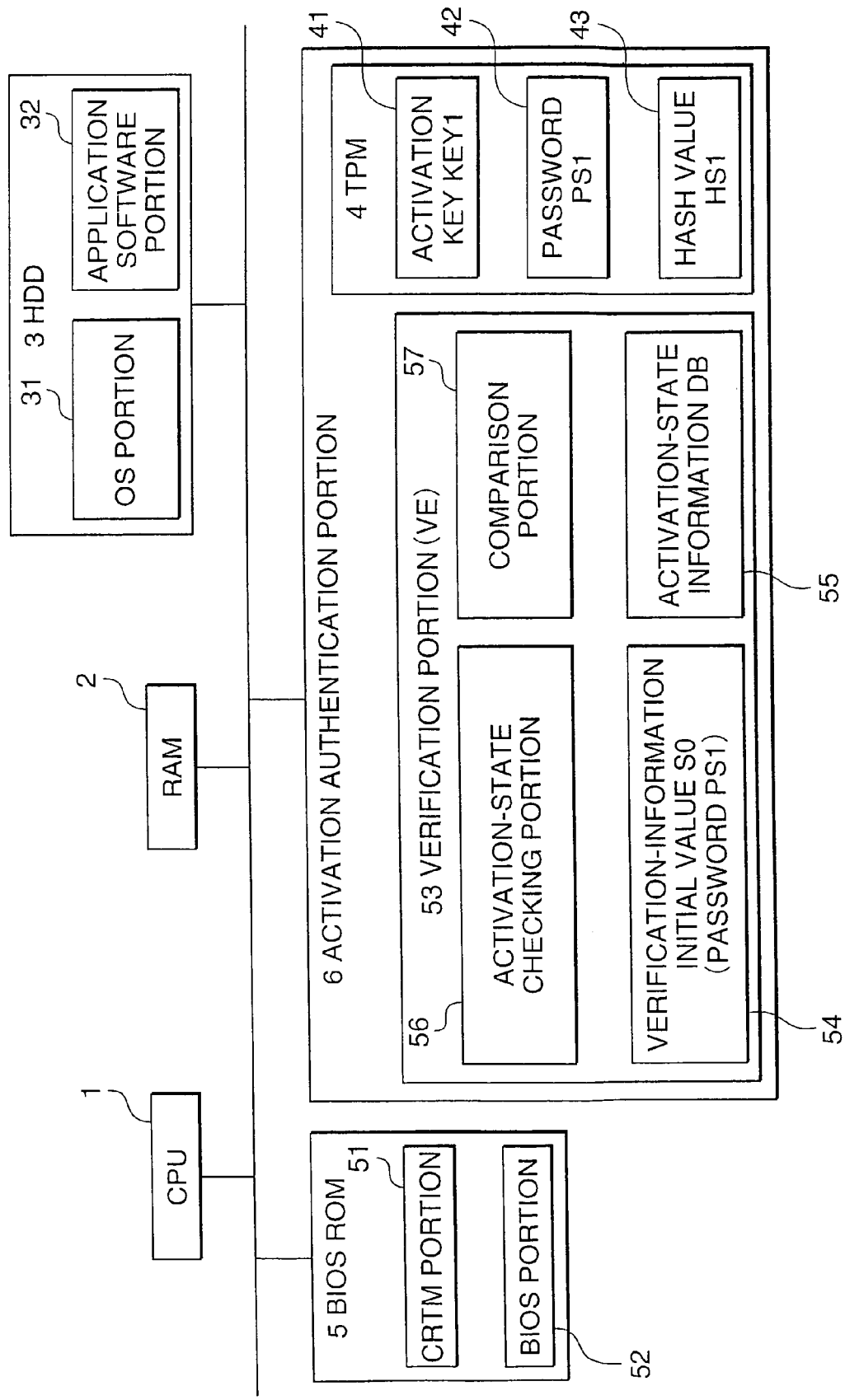
FIG. 2 is a block diagram of the structure of an example of an information processing device according to the present invention.

FIG. 1 and FIG. 2 illustrate block diagrams of the structures of examples of an information processing device according to the present invention.

The information processing device according to the present invention is a computer in, for example, a personal computer, a work station, a server, or a cellular phone.

The present invention is characterized in that a TPM chip and an activation verification module (also refereed to as a verification portion or a verification engine VE) are mounted in such a computer. The activation verification module is realized by software or hardware. FIG. 1 illustrates a structure of the activation verification module which is realized mainly by software, and FIG. 2 illustrates a structure of the activation verification module which is realized mainly by hardware.

In FIG. 1, the information processing device according to the present invention is mainly constituted by a CPU 1, a RAM 2, a hard disk HDD 3, a TPM 4, and a BIOS ROM 5.

The CPU 1 is a control portion which organically operates respective components of the present invention, on the basis of programs stored in the RAM and ROM, for realizing predetermined functions. The CPU 1 also includes functional modules such as a cash resistor, a RAM, an I/O controller, a timer and the like.

The RAM 2 is a memory which temporarily stores programs or data during execution of functions of the device.

The hard disk HDD 3 is a large-capacity storage device which stores an operating system OS, application programs, and various types of files of documents and the like.

The HDD 3 includes, for example, an OS portion 31 which stores an OS and an application-software portion 32 which stores application programs for creating documents, processing images and the like, as illustrated in FIG. 1.

The TPM 4 is a hardware chip including a CPU, a ROM, a RAM, a nonvolatile memory, a timer and the like, and information required for activation verification is recorded in the TPM 4.

The information required for activation verification is, for example, an activation key (KEY1) 41, a password (PS1) 42, and a hash value (HS1) 43, as illustrated in FIG. 1. The information is stored in the nonvolatile memory in the TPM 4 at shipment or at first activation after the purchase of the device by a user.

The activation key (KEY1) refers to a key required for activating the OS. The OS portion 31 stores the operating system OS and, if the OS is stored at a state where it is coded, the activation key 41 is used as a decoding key for decoding the coded OS and restoring it to a state where it can be activated.

Namely, in activation verification processing in the CPU 1, the CPU 1 receives the activation key 41 from the TPM 4 for activating the OS.

The password (PS1) 42 is specific information required for forcibly causing the TPM 4 to output the activation key (KEY1) 41 and is also called a recovery password.

The password (PS1) 42 is provided by the user or automatically created at the first activation or at shipment and is pre-stored in the nonvolatile memory in the TPM 4 and the BIOS ROM 5.

The hash value (HS1) 43 is information to be compared with verification data A supplied to the TPM 4 in activation verification processing, which will be described later, and is stored in the nonvolatile memory in the TPM 4. The hash value 43 is pre-stored at shipment and can be updated through commands input by the user after normal activation.

The TPM 4 is a chip created on the basis of a specification defined by the TCG as previously described, and also input data and output data to and from the TPM 4 and the functions of the TPM 4 are also defined according to the specification.

For example, if the TPM 4 receives a request for outputting the activation key 41, from a module program outside of the TPM 4 (a BIOS portion, a CRTM portion or a verification portion), the TPM 4 checks verification data A included in the request and, only if the verification data A matches with the pre-stored hash value (HS1) 43, outputs the activation key (KEY1) 41 to the module program which made the request. If they do not match with each other, the TPM 41 outputs nothing or sends a reply indicative of the fact of the failure of verification, to the module program which made the request.

In FIG. 1, the BIOS ROM 5 is a nonvolatile memory such as a flash memory or a PROM and also is a memory which stores a group of system programs to be first activated at power-on of the personal computer or the like.

The group of system programs is constituted by, for example, a CRTM portion, a hardware initialization portion, an Option ROM for video BIOS, etc., and the like.

The CRTM portion is a program which is first activated after resetting and expands the BIOS ROM in a memory.

The BIOS portion is a system program for controlling the inputting/outputting from and to external devices connected to the device, such as a keyboard, a mouse, an HDD.

Further, the present invention is characterized in that the BIOS ROM 5 includes the verification portion (verification engine: VE) 53.

The verification portion (VE) 53 is a portion which performs activation verification for the group of system programs and is mainly constituted by an activation-state checking portion 56, a comparison portion 57 and a memory storing a verification-information initial value table (SO) 54 and an activation-state information DB 55.

Further, the verification (VE) 53 is a portion which is theoretically positioned between the group of system programs, such as the CRTM portion 51, the BIOS portion 52 and the OS portion 31, and the TPM 4 and performs controlling of data transmission and reception between the group of system programs and the TPM 4 and inspection processing on the group of system programs during activation in the event of failure of verification by the TPM.

The verification-information initial value table (SO) 54 is information which is preset at shipment or first activation of the personal computer or the like and includes the aforementioned password (PS1) 42.

In the verification-information initial value table (SO) 54, there is recorded information required for identifying valid system programs to be activated.

FIG. 3 illustrates an explanation view of an example of the verification-information initial value table SO.

For example, as illustrated in FIG. 3, the verification-information initial value table SO includes the module names of valid system programs which are permitted to be activated, and hash values HS, PCR numbers, set values, public keys KEY2, passwords PS1 and the like for these programs.

In this case, the hash values HS for the programs are hash values for the respective individual programs and also are numerical values which have been calculated in advance by BIOS venders.

Further, the PCR numbers indicate the PCR numbers in the TPM chip at which the corresponding programs are stored. For example, a PCR number of 0 indicates a number at which initialization programs, such as CRTM, which have been executed after resetting are stored. Further, a PCR number of 1 indicates a number at which the state of the hardware structure is stored, and a PCR number of 2 indicates an area at which the state of the option ROM is stored.

The public key KEY2 refers to a key for use in verification of signed programs.

The activation-state information DB55 is data which is created after the activation states of the system programs are checked after the personal computer or the like is powered up and activated and is also referred to as a result DB. For example, information about the activation state of the BIOS portion 52 after the activation thereof is stored in the result DB.

FIG. 4 illustrates an explanation view of an example of the activation-state information DB (result DB) 55 according to the present invention.

In FIG. 4, the activation-state information DB 55 is constituted by program module names and information about the results of pass/fail of activation, PCR numbers and the results of pass/fail of set values.

For example, there is indicated that a module program named "Initialization Routine" has been normally activated at a PCR of 0.

The activation-state checking portion 56 is a portion which, during the activation of the respective system programs, checks the states of the programs and creates the activation-state information DB 55.

The comparison portion 57 is a portion which makes a comparison between the pre-stored verification-information initial value table (SO) 54 and the activation-state information DB 55 after actual activation.

If the comparison processing reveals that both the information match with each other, this means that the inspection of the system programs has succeeded. Namely, this means that no invalid programs exist and the activation processing has been normally executed.

In the case where the inspection has succeeded, it is determined that the activation of the system programs is valid and should be permitted, even if the verification processing by the TPM has failed, and the subsequent activation processing (for example, the activation of the OS) is continued.

On the other hand, if both the information do not match with each other, this means that the current activation processing is abnormal and there is the possibility of existence of invalid programs or the like and, accordingly, the activation of the system programs cannot be permitted. In this case, the subsequent activation processing is interrupted, in principle.

FIG. 2 illustrates a block diagram of the structure of an information processing device including an activation authentication portion 6 including a verification portion (VE) 53 and a TPM 4.

The structure of FIG. 2 is different from the structure of FIG. 1 in that the verification portion 53 and the TPM 4 are structured as a single hardware module. Accordingly, the verification portion 53 is eliminated from the BIOS ROM 5 of FIG. 1. The internal structures and the functions of the verification portion 53 and the TPM 4 are the same as those in FIG. 1.

(The General Outline of Verification processing According to the Invention)

Figure 5:
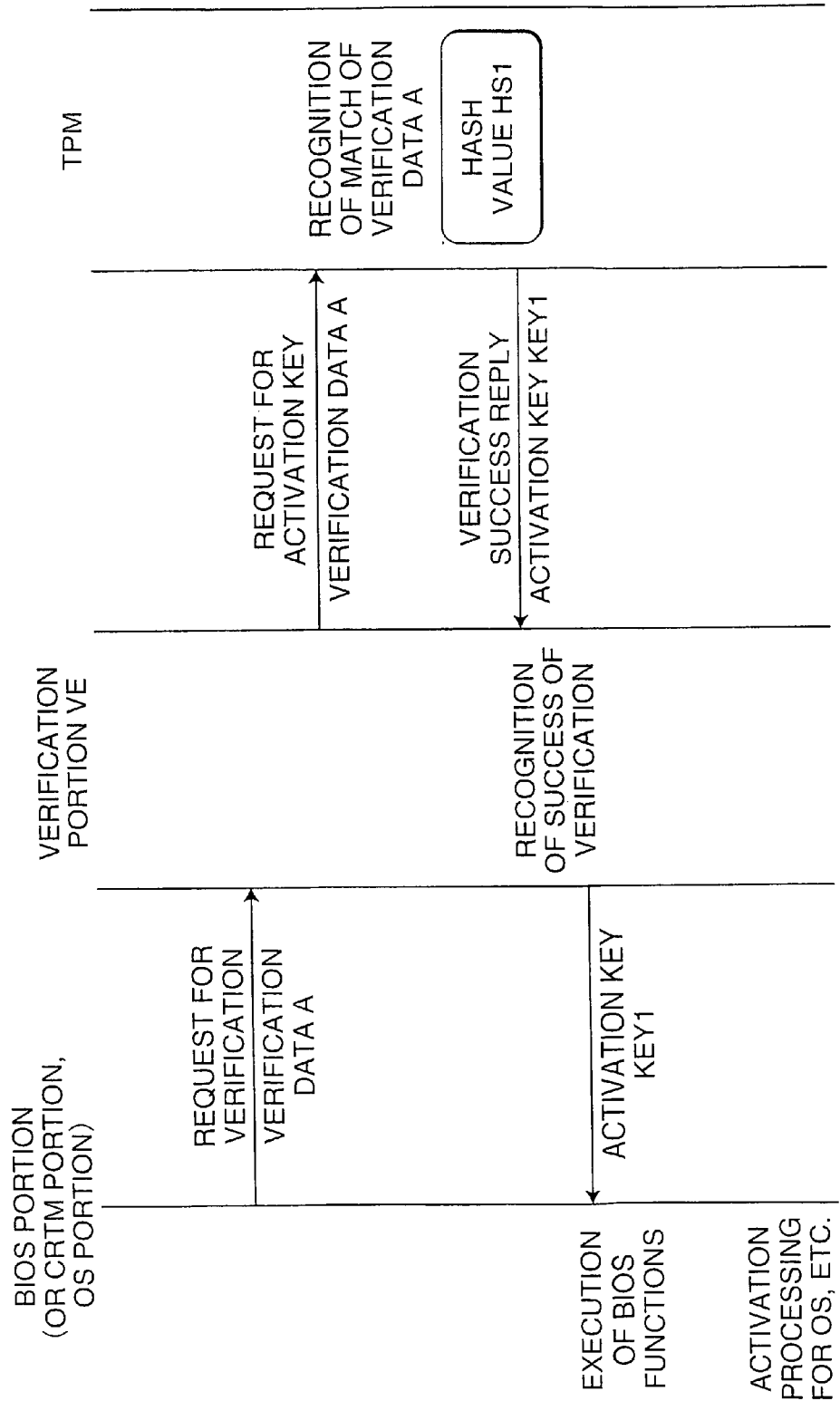
FIG. 5 is an explanation view of exemplary verification processing in the information processing device according to the present invention.
Figure 6:
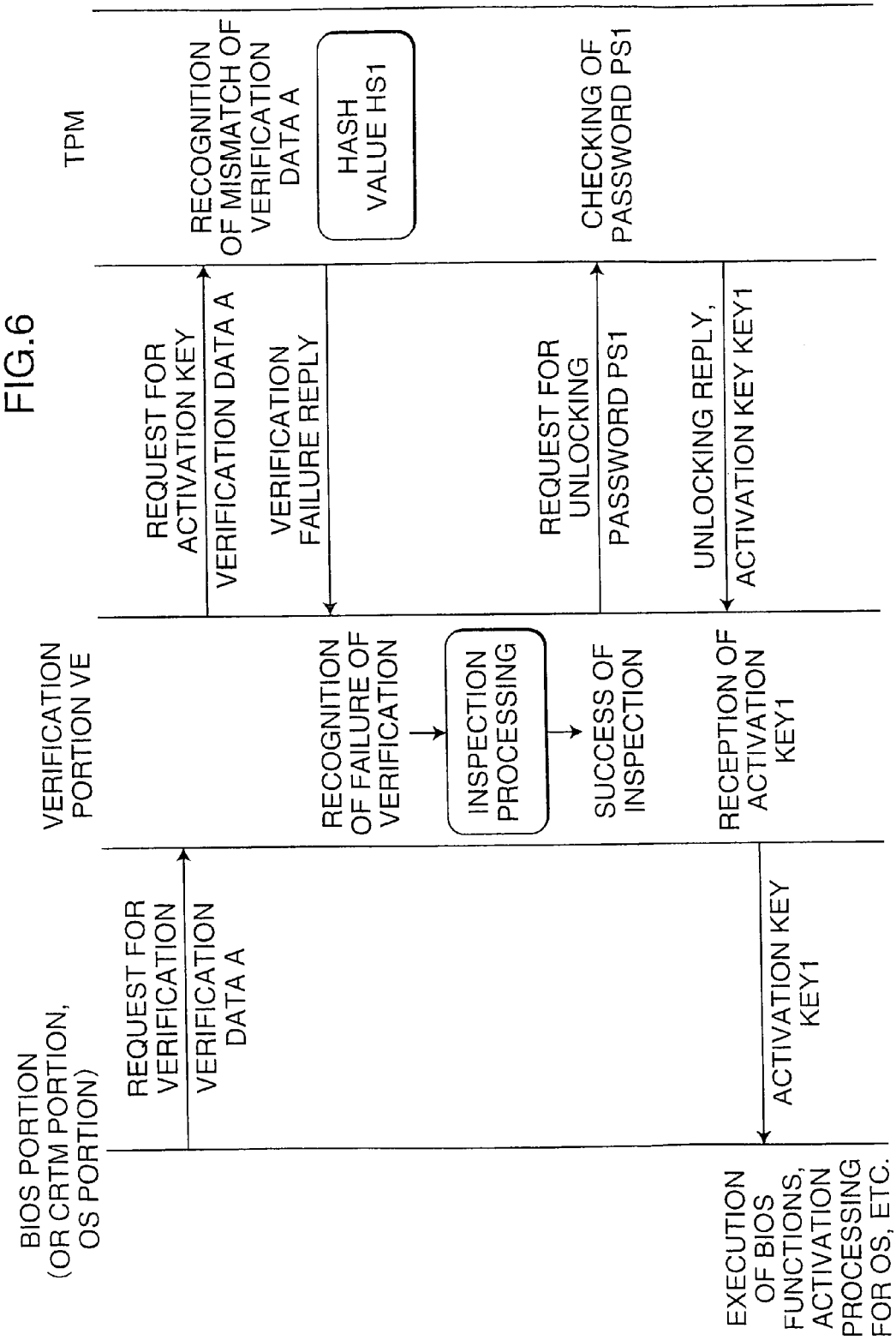
FIG. 6 is an explanation view of exemplary verification processing in the information processing device according to the present invention.
Figure 7:
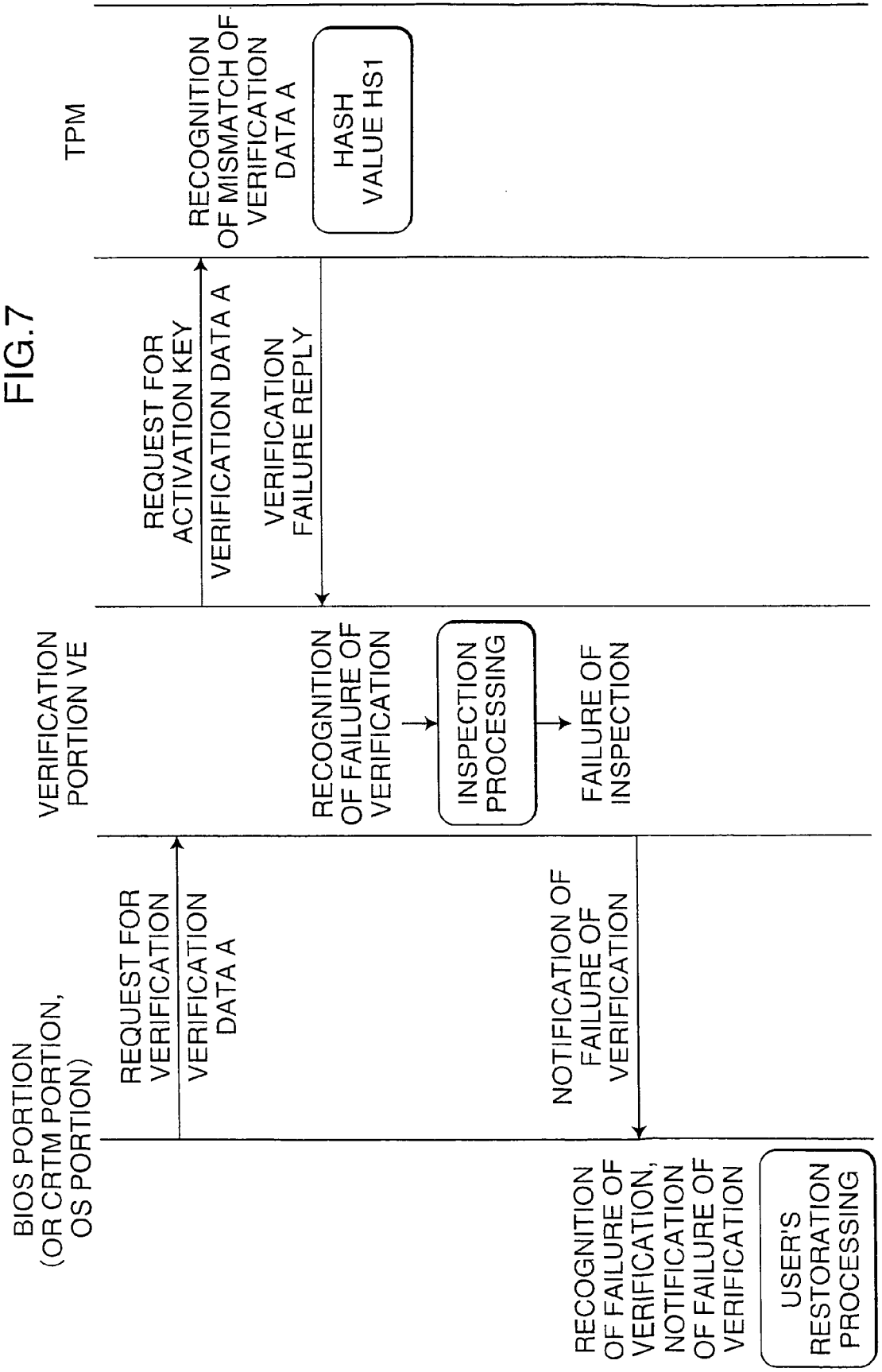
FIG. 7 is an explanation view of exemplary verification processing in the information processing device according to the present invention.

FIG. 5, FIG. 6 and FIG. 7 illustrate explanation views of examples of verification processing according to the invention.

FIG. 5 illustrates processing in the case where verification by the TPM 4 has succeeded.

FIG. 6 illustrates processing in the case where verification by the TPM 4 has failed, but inspection processing by the verification portion VE 53 has succeeded.

FIG. 7 illustrates processing in the case where verification by the TPM 4 has failed and inspection processing by the verification portion VE 53 has also failed.

Any of the figures illustrate data flows among the three functional components.

In this case, the BIOS portion illustrated therein may be replaced by any of the system programs being activated and also may be replaced by the CRTM portion or the OS portion.

In FIG. 5, if the BIOS portion 52 is activated at first, the BIOS portion 52 sends a "request for verification" to the verification portion VE, before executing the inherent functions of the BIOS portion. At this time, verification data A which is unique to the BIOS portion is sent to the verification portion VE, along with the request for verification.

Such verification data A is information created by a program portion being currently operated and may be, for example, a hash value calculated by the CRTM portion.

On receiving the request for verification, the verification portion VE sends a "request for the activation key" to the TPM 4. At this time, the verification data A is sent to the TPM 4 along therewith.

On receiving the "request for the activation key", the TPM 4 makes a comparison between the received verification data A and the hash value HS1 which has been pre-stored in the TPM 4 to determine whether or not they match with each other.

If they match with each other, the TPM 4 sends, to the verification portion VE, a replay indicative of the fact of the success of the verification by the TPM 4 (verification-success reply). At this time, the TPM 4 further sends the pre-stored activation key KEY1 to the verification portion VE.

On recognizing the success of the verification from the replay, the verification portion VE sends the received activation key KEY1 to the BIOS portion 52 which made the request for verification.

Thereafter, the BIOS portion executes its inherent functions and further executes processing for activating the OS and the like.

Next, with reference to FIG. 6, there will be described the case where the verification by the TPM 4 has failed.

The case where the verification processing by the TPM 4 has failed includes the case where the order of activation of system programs has been changed, the case where an external peripheral device has been newly connected, the case where a RAM is newly mounted and the like, as well as the case where an invalid program has been activated.

Since the aforementioned cases other than the case where an invalid program has been activated should be considered to be normal activation, in such cases the personal computer should be restored to be usable by the user, without interrupting the subsequent activation processing.

In FIG. 6, if the received verification data A does not match with the hash value HS1, the TPM 4 sends, to the verification portion VE, a replay indicative of the fact of the failure of the verification.

On recognizing the failure of the verification, the verification portion VE executes activation inspection processing for checking the validity of the activated system programs. In this inspection processing, a comparison is made between the activation-state information DB and the verification-information initial value table SO.

If the comparison reveals that they match with each other, the verification portion VE determines that the inspection has succeeded and sends, to the TPM 4, a request for unlocking the activation key. In sending the request for unlocking, the verification portion VE further sends the password PS1 pre-stored therein to the TPM 4.

On receiving the request for unlocking, the TPM 4 makes a comparison between the password PS1 and a password which has been pre-stored therein to determine whether or not the password PS1 is valid.

If the TPM 4 determines that both the passwords match with each other, the TPM 4 sends the pre-stored activation key KEY1, as an unlocking reply, to the verification portion VE.

On receiving the activation key KEY1, the verification portion VE sends the activation key KEY1 to the BIOS portion which made the request for verification.

On receiving the activation key KEY1, the BIOS portion executes BIOS functions and then activates the OS and the like. In this case, the verification by the TPM has failed, but it is determined that the failure was due to a cause which lies within a normal range which allows permitting the activation, not due to the existence of an invalid program, and the subsequent activation processing is executed.

Namely, with only verification by a conventional TPM, even if the verification fails due to other causes than the existence of an invalid program, the subsequent activation is prevented from being performed and the user is required to perform manual restoration processing. However, the present invention enables automatic restoration processing (normal activation processing) without involving user's active restoration processing.

Next, with reference to FIG. 7, there will be described the case where the verification by the TPM has failed and further the inspection processing by the verification portion VE also has failed.

In FIG. 7, the verification portion VE executes inspection processing similarly to that illustrated in FIG. 6, after recognizing the failure of the verification by the TPM. However, it is assumed that the inspection processing reveals that the activation-state information DB and the verification-information initial value table SO do not match with each other and, thus, the inspection fails.

In this case, the verification portion VE notifies the BIOS portion which made the request for verification of the failure of the verification.

On recognizing the failure of the verification, the BIOS portion causes notification processing for notifying the user of the failure of the verification to be executed, to notify the user of the fact of the failure of the verification and the cause thereof. On receiving the notification, the user makes an attempt to perform manual restoration processing.

In this case, both the verification by the TPM and the inspection by the verification portion VE have failed and, therefore, there is the possibility of existence of an invalid program.

Accordingly, the BIOS portion may notifies the user of the possibility of existence of an invalid program, as the cause of the failure of the verification.

(Verification-Information Initial Setting Processing)

In the present invention, in order to cause the verification portion VE 53 to perform verification processing as described above, it is necessary to perform, in advance, initial setting of information that is required for verification of the group of system programs being activated, at the shipment of the information processing device or at the first power-on of the information processing device by the user after the purchase thereof.

In this case, the information to be initially set includes the activation key KEY1 (41), the password PS1 (42) and the hash value HS1 (43) in the TPM 4, and the verification-information initial value table SO (54), the public key KEY2 and the password PS1 in the verification portion 53.

At the shipment of the information processing device according to the present invention, the maker inputs, thereto, initial values of the aforementioned to-be-initially-set information, on the basis of a predetermined design specification.

Further, at the first power-on after purchase, the user is required to input initial values or a command for creating (or updating) the initial values, so that the initial setting of the to-be-initially-set information is made.

Figure 8:
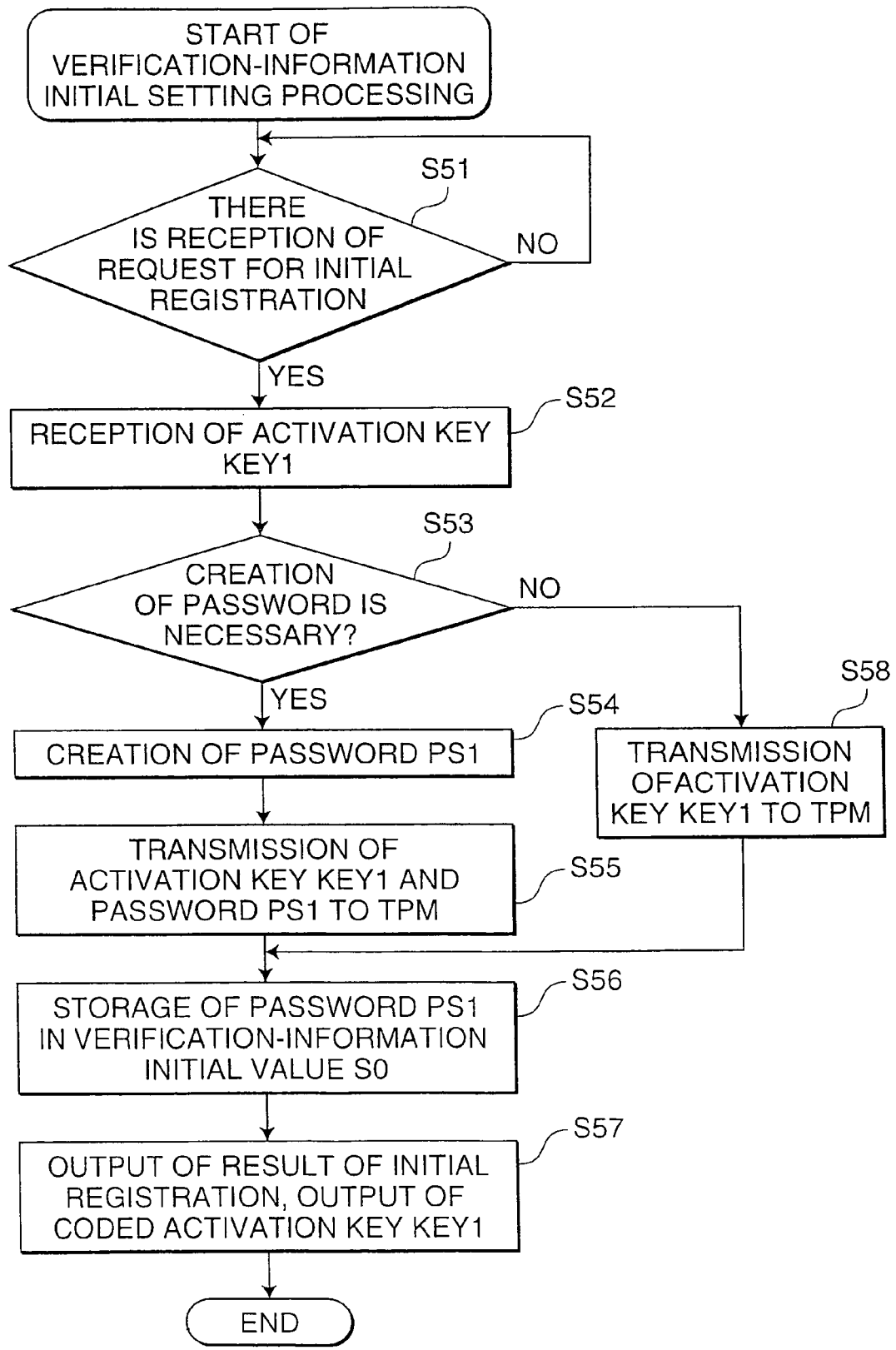
FIG. 8 is a flow chart of verification-information initial setting processing according to the present invention.
Figure 9:
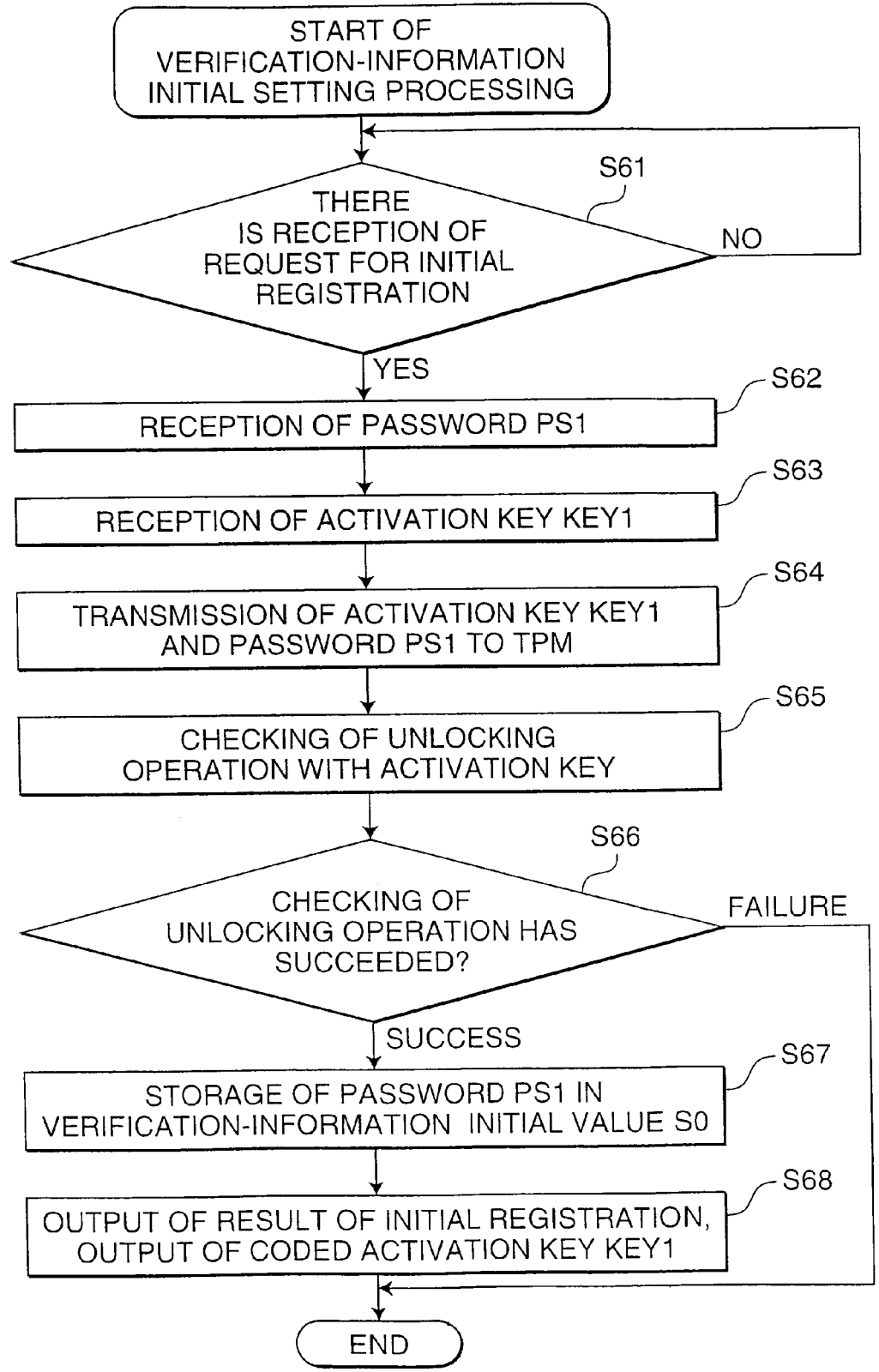
FIG. 9 is a flow chart of verification-information initial setting processing according to the present invention.

FIGS. 8 and 9 illustrate flow charts of examples of processing for making initial setting of the activation key KEY1 and the password PS1, which is executed by the verification portion VE according to the present invention.

FIG. 8 illustrates a case where the verification portion creates the password PS1.

In FIG. 8, at first, it is checked whether or not the user has input a request for initial registration (step S51). The user inputs the activation key KEY1 when making a request for initial registration.

Next, at a step S52, the verification portion VE receives the activation key KEY1.

At a step S53, it is checked whether or not a password should be automatically created.

For example, if the user has input a command for creating a password, then the processing proceeds to a step S54 where a password PS1 is created. The processing for creating a password PS1 is performed by, for example, executing a random-number creating processing in the TPM chip.

Next, at a step S55, the input activation key KEY1 and the created password PS1 are transmitted to the TPM 4.

On the other hand, if it is not necessary to create a password, then the processing proceeds to a step S58 where the input activation key KEY1 is transmitted to the TPM 4.

Next, at a step S56, the password PS1 is recorded in the verification-information initial value table SO.

The password PS1 is used in making a request for unlocking to the TPM 4.

If plural activation keys KEYs are to be registered, passwords are recorded therein, in association with information (the names of the keys) for identifying the respective activation keys.

At a step S57, the result of the initial registration processing is output to notify the user thereof. At this time, the activation key KEY1 which has been coded using the TPM chip is also output to the source of the request for creating the key.

FIG. 9 illustrates initial setting processing in the case where the user inputs the password PS1 and the activation key KEY1.

At a step S61 in FIG. 9, at first, it is checked whether or not the user has input a request for initial registration and, if he or she has input it, then the processing proceeds to a step S62.

At the step S62, an input password PS1 is received.

Next, at a step S63, an input activation key KEY1 is received.

Further, at a step S64, the input password PS1 and the input activation key KEY1 are transmitted to the TPM 4. At this time, the TPM 4 receives the password PS1 and the activation key KEY1 and then stores them in an internal memory.

At a step S65, it is determined whether or not unlocking operation can be normally performed using the activation key KEY1.

At this time, the password PS1 is transmitted to the TPM 4, along with information about a request for unlocking. On receiving the request for unlocking and the password PS1, the TPM 4 checks whether or not the password PS1 is a valid password which can permit unlocking and then outputs, to the verification portion VE, the activation key KEY1 received at the step S64.

On recognizing the activation key KEY1 output from the TPM, the verification portion VE confirms that the unlocking operation can be normally performed.

At a step S66, if it is confirmed that the unlocking processing has succeeded, the processing proceeds to a step S67. On the other hand, if the unlocking has failed, the initial setting processing is interrupted. Also, the user may be notified of the fact of the failure.

At the step S67, the password PS1 is recorded in the verification-information initial value table SO.

At a step S68, the result of the initial registration processing is output, similarly to at the step S57.

As described above, with the processing illustrated in FIG. 8 or FIG. 9, the initial setting of the information required for the verification of the activation of the system programs can be made.

Further, the user is enabled to update the initially-set information which has been set in advance, by activating the aforementioned initial setting processing at proper timing.

(Verification Processing by the Verification Portion)

Hereinafter, there will be described the concrete content of the verification processing which is executed by the verification portion VE 53.

Figure 10:
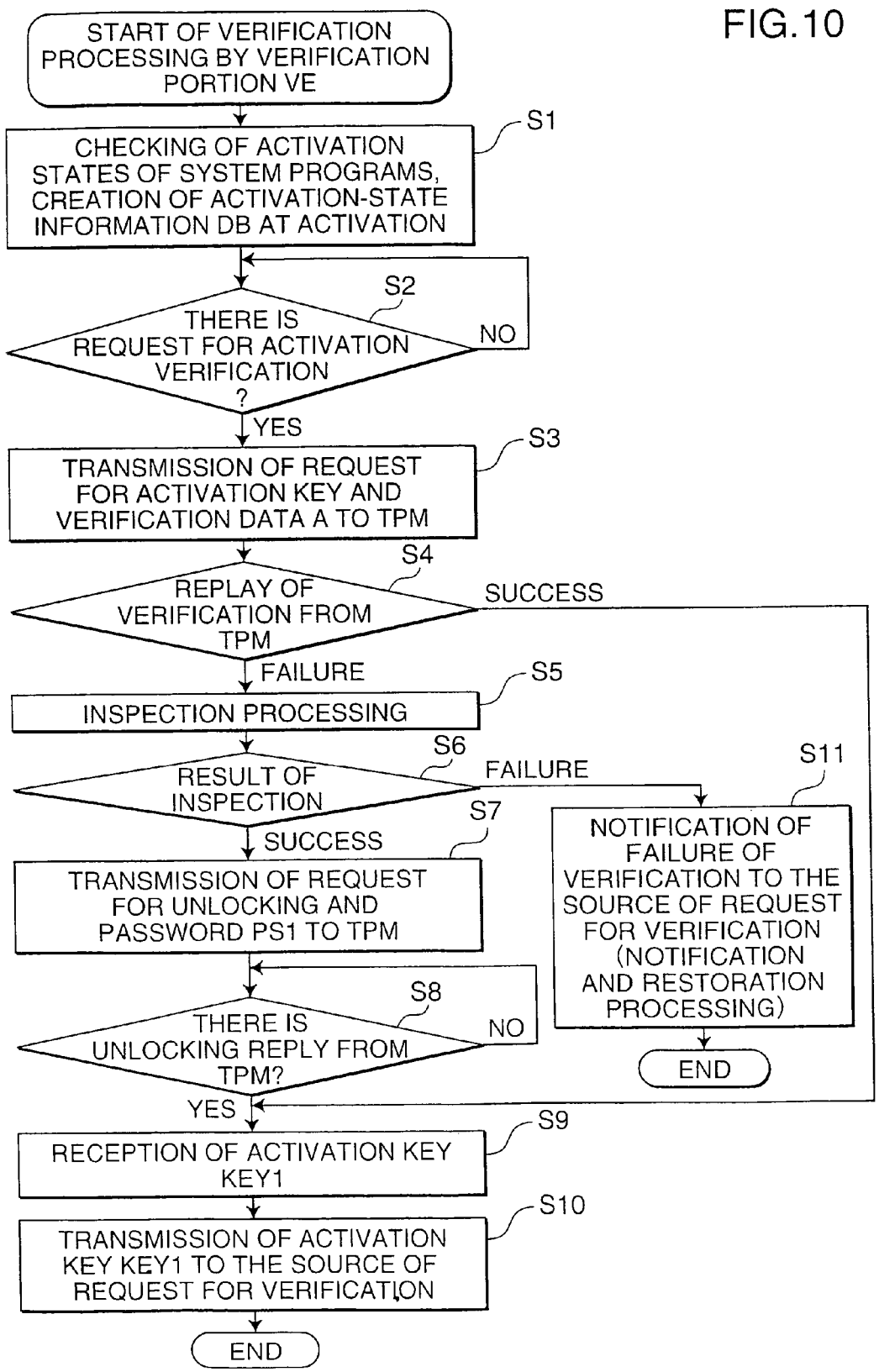
FIG. 10 is a flow chart of verification processing by a verification portion according to the present invention.

FIG. 10 illustrates a flow chart of exemplary verification processing by the verification portion.

According to the flow, any of the aforementioned processes of FIGS. 5, 6 and 7 is performed.

In FIG. 10, it is assumed that the user has powered up the information processing device according to the present invention and, thus, the verification portion VE has been activated.

First, at a step S1, the activation-state checking portion 56 in the verification portion VE checks the activation state of the group of the system programs, such as the CPRM portion and the BIOS portion.

Through the checking operation, an activation-state information DB indicative of the activation states of the respective system programs at the current activation is created. For example, an activation-state information DB as illustrated in FIG. 4 is created.

Figure 11:
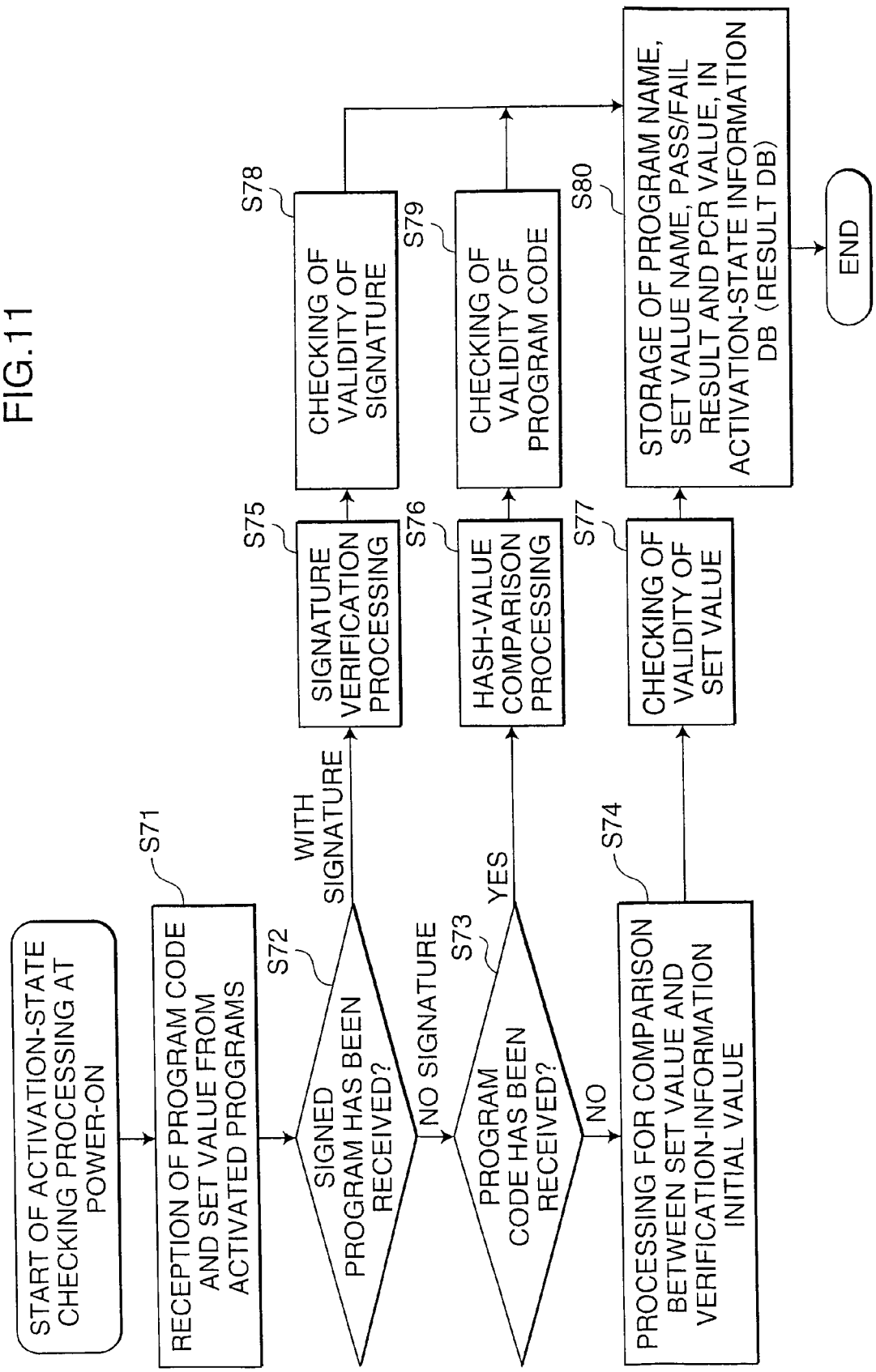
FIG. 11 is a flow chart of activation-state checking processing at power-on according to the present invention.

FIG. 11 illustrates a flow chart of exemplary activation-state checking processing (step S1) at power-on.

First, at a step S71, the activation-state checking portion 56 in the verification portion VE receives, from the activated system program (for example, the BIOS portion), a program code of the BIOS portion and a set value for use in activation. However, if there is no set value, the activation-state checking portion 56 does not receive set value.

At a step S72, it is checked whether or not the received program has an electronic signature placed thereon.

If it has an electronic signature, the processing proceeds to a step S75 where signature verification processing is performed. The signature verification processing is performed by, for example, decoding the portion of the signature using the public key KEY2 recorded in the verification-information initial value table SO and making a comparison between the decoded signature and the hash value for the program.

At a step S78, if it is proven from the verification processing that the signature is valid, then information indicative of the validity of the activation of the program is recorded in the field of the pass/fail result in the activation-state information DB 55 (step S80).

For example, as illustrated in FIG. 4, if a system program named "Initial Routine" has a valid signature placed thereon, then "a round mark" is recorded in the field of the pass/fail result in the activation-state information DB 55. On the contrary, if it is not proven that the signature is valid, then "a cross mark" indicative of the invalidity is recorded in the field of the pass/fail result.

At the step S80, the pass/fail result is recorded, in association with the name of the activated system program and the PCR value thereof.

At the step S72, if the received system program has no signature placed thereon, the processing proceeds to a step S73 where it is checked whether or not the program code of the system program has been received.

If the program code has been received, then the processing proceeds to a step S76 where hash-value comparison processing is performed. The hash-value comparison processing is processing for making a comparison between a hash value calculated from the received program code and the hash value HS of the system program which has been pre-stored in the verification-information initial value table SO (54).

If the comparison reveals that both the hash values match with each other, it is determined that the activated system program is valid. If they do not match, it is determined that the system program is invalid.

Namely, if it is confirmed at a step S79 that the program code is valid, then information "a round mark" indicative of the validity of the activation of the system program is recorded in the field of the pass/fail result (step S80).

On the other hand, if it cannot be confirmed that the program code is valid, then information "a cross mark" indicative of the invalidity of the activation of the system program is recorded in the field of the pass/fail result (step S80). At this time, the pass/fail result is recorded in the activation-state information DB 55, in association with the name of the system program.

If it is determined at the step S73 that the received information is not the program code, then it is deemed that the received information is a set value, and the processing proceeds to a step S74 where processing for making a comparison between the received set value and the set value which has been pre-stored in the verification-information initial value table SO is performed.

At a step S77, if the comparison reveals that both the set values match with each other, then it is determined that the set value is valid and, thus, it is confirmed that the program having the set value is valid.

Then, information "a round mark" indicative of the validity is recorded in the field of the pass/fail result (step S80).

On the other hand, if these set values do not match with each other, then it is determined that the set value is invalid and information "a cross mark" indicative of the invalidity is recorded in the field of the pass/fail result (step S80). At this time, similarly, the pass/fail result is recorded in the activation-state information DB 55, in association with the name of the set value.

There has been described the concrete content of the processing at the step S1 in FIG. 10 which checks the validity of the activation states of all the activated system programs and creates the activation-state information DB 55 at the current activation.

Next, at a step S2 in FIG. 10, it is checked whether or not there is a request for activation verification.

For example, if there is a request for activation verification from the BIOS portion 52 as illustrated in FIG. 5, then the processing proceeds to a step S3. The request for verification includes verification data A.

At the step S3, the verification portion VE transmits, to the TPM 4, a request for the activation key including the verification data A.

The verification data A is, for example, a hash value determined from the system program itself, through the checking processing at the step 1. The hash value is data to be used in verification by the TPM.

On receiving the request for the activation key, the TPM 4 performs verification processing and sends a replay indicative of the result of the verification (success or not) to the verification portion.

Next, at a step S4, the verification portion VE checks the replay indicative of the result of the verification from the TPM 4. If the replay indicates success, then the processing proceeds to a step S9, but if it indicates the failure, then the processing proceeds to a step S5.

In the case of success, the processing corresponds to the flow of the verification processing of FIG. 5.

At a step S9, the verification portion VE receives the activation key KEY1 transmitted from the TPM.

Next, at a step S10, the verification portion VE transmits the activation key KEY1 to the system program which made the request for verification.

On the other hand, if the verification by the TPM fails, then the comparison portion 57 in the verification portion VE executes inspection processing at a step S5.

In the inspection processing, a comparison is made between the information stored in the verification-information initial value table SO and the content of the activation-state information DB which has been created at the step S1.

Figure 12:
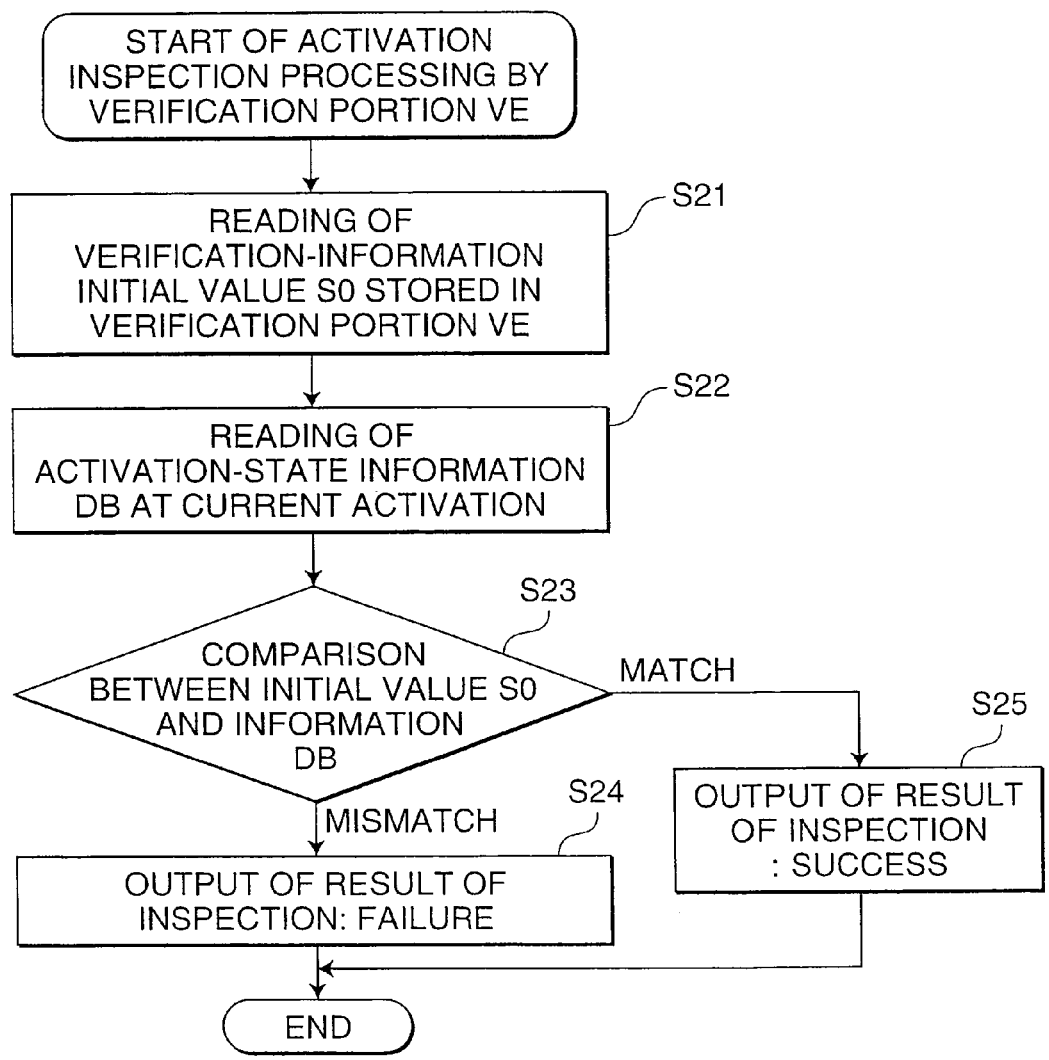
FIG. 12 is a flow chart of activation inspection processing by the verification portion according to the present invention.
Figure 13:
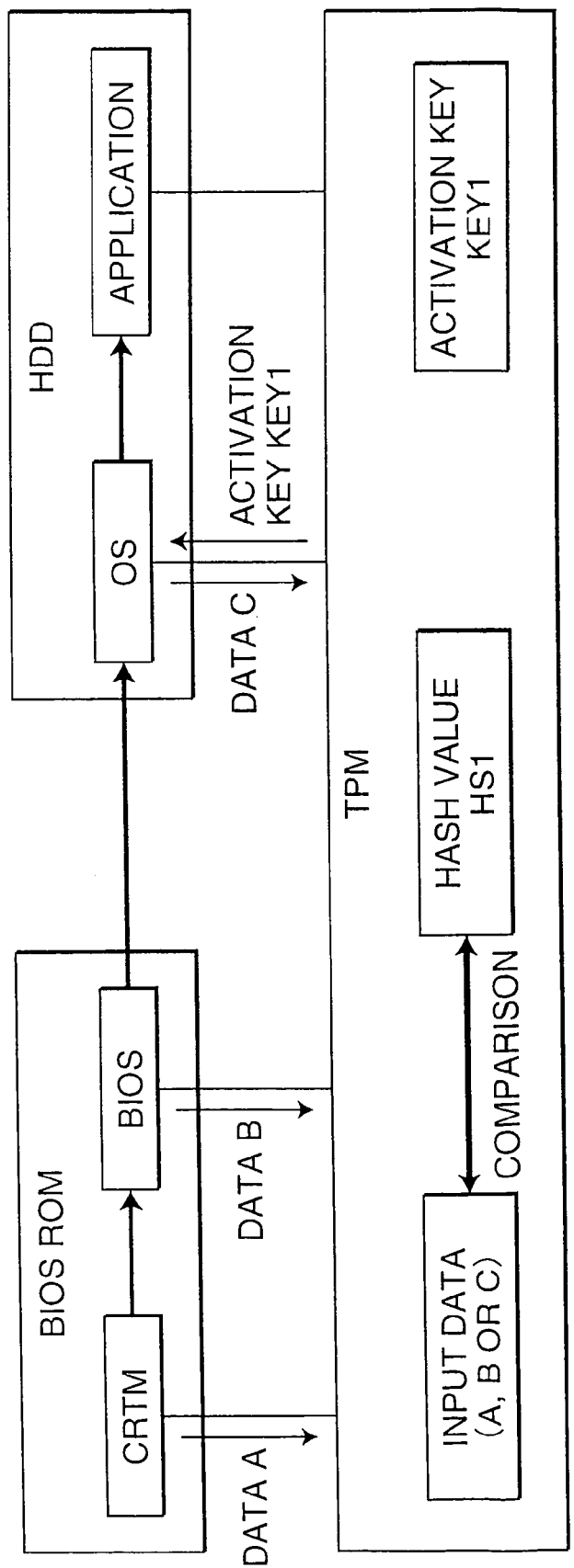
FIG. 13 is an explanation view of verification processing during activation of a conventional information processing device.

FIG. 12 illustrates a flow chart of exemplary inspection processing which is executed by the compassion portion 57 in the verification portion VE according to the present invention.

At a step S21, the data of the verification-information initial value table SO stored in the verification portion VE is read.

Further, at a step S22, the data of the activation-state information DB at the current activation which has been created at the step S1 is read.

At a step S23, a comparison is made between the read data of the initial value table SO and the data of the activation-state information DB. This comparison is a comparison between the program names included in both the data and between the hash values for the program included therein.

If all of the corresponding data in both the data matches with each other, the processing proceeds to a step S25 where notification of the success of the inspection is output.

On the other hand, if any of the corresponding data does not match, then the processing proceeds to a step S24 where notification of the failure of the inspection is output.

As described above, if the contents of both the data match with each other, then it is determined that the inspection has succeeded.

Further, in the inspection processing, if the created activation-state information DB includes a program PG which is not included in the initial value SO (54), then it is determined that the program PG is an invalid program and it is confirmed that there exists an invalid program and, thus, it is determined that the inspection has failed.

At a step S6, if the inspection processing at the step S5 has resulted in success, it is determined that the activation is valid although it has been determined to be invalid, from the verification by the TPM, and the processing proceeds to a step S7.

On the other hand, at the step S6, if the inspection processing has resulted in failure, it is deemed that there exists an invalid program and, therefore, the activation is invalid, and the processing proceeds to a step S11.

In the case where the processing proceeds to the step S7, the processing corresponds to the processing flow of FIG. 6.

In the case where the processing proceeds to the step S11, the processing corresponds to the processing flow of FIG. 7.

At the step S7, since the inspection has succeeded, a request for unlocking is transmitted to the TPM 4, in order to advance the subsequent activation processing. Namely, in order to acquire the activation key KEY1 from the TPM 4, the password PS1 is read from the verification-information initial value table SO (54) and is transmitted to the TPM 4.

On receiving the request for unlocking and the password PS1, the TPM 4 checks the validity of the password PS1 and, if it is valid, transmits the pre-stored activation key KEY1 to the verification portion VE.

Next, at a step S8, the verification portion VE checks whether or not there is an unlocking reply from the TPM 4. If there is an unlocking reply therefrom, then the processing proceeds to a step S9 where the verification portion VE receives the activation key KEY1 as previously described and, at a step S10, the verification portion VE transmits the activation key KEY1 to the source of the request for verification.

At the step S6, if the inspection has failed, then the processing proceeds to a step S11 where notification of the failure of the verification is provided to the system program which made the request.

In this case, on recognizing the failure of the verification, the system program notifies the user of the failure of the verification to inform the user of the necessity of restoration processing. At this time, notification of the existence of an invalid program may be provided to the user.

As described above, since the verification portion VE performs inspection processing separately from the verification by the TPM, even if the verification by the TPM fails, in the case where the subsequent activation processing can be permitted to be advanced, the device can be automatically restored without involving user's operations and the subsequent activation processing can be normally advanced.

Namely, even if the verification by the TPM fails, in the case where the failure was due to a cause other than the existence of an invalid program, such as, for example, cases where an external device has been newly connected or a RAM is newly mounted, which allow normal activation, the activation processing is automatically advanced, thereby reducing the burden on the user during the subsequent restoration processing.

(Restoration Processing Executed in the Event of Failure of Verification)

If the existence of an invalid program is detected at the step S11 in FIG. 7 and FIG. 10, it is necessary that the program is eliminated or the device is restored to the same state as that which enabled normal operation. In this case, the user is required to perform restoration processing.

For example, a recovery OS is pre-stored in the hard disk HDD 3. The recovery OS is an OS dedicated for recovery, unlike the OS stored in the OS portion 31 which is kept activated.

Further, the recovery OS is adapted to be activated, in the event that the BIOS portion 52 recognizes the failure of verification as in FIG. 7.

When the recovery OS is activated, a recovery program is activated or made ready to be activated. At this state, the user performs updating of the BIOS, changing of the BIOS setting, checking of the device structure and the like for restoring the device to the normal activation state.

Further, in the event that the verification has failed due to abnormal set values for use in activation, it is also necessary that similar restoration processing is performed to restore the set values to normal values. In this case, similarly, the recovery OS may be activated to reset the set values. Also, instead of the recovery OS, a specific program for recovering set values may be activated to restore the set values to within a pre-permitted range.

Further, there may be cases where the BIOS itself should be updated because of the circumstance of the maker and cases where BIOS set values and the like should be changed. After such updating and the like, the activation verification may fail and, accordingly, it is necessary to rewrite the verification information pre-stored in the verification portion VE and the TPM 4.

In this case, for example, a specific setting program can be activated at an activation state which enables the user to use application programs and then a BIOS updating program, BIOS set values, etc., stored in an FD, a CD-ROM or the like provided by the maker can be read to update the verification information. Also, such an updating program and such set values can be downloaded through a network such as the internet to update them.

According to the present invention, in addition to the checking of the validity of system programs by the security chip, the validity of the activation states of the system programs is verified even if the aforementioned checking of the validity has failed, which enables restoration processing during activation without involving user's operation, in the case where the activation of the system programs can be permitted, thereby reducing the burden on the user during the restoration processing at the activation.

What is claimed is:

1. An information processing device, comprising:
a module recording portion that stores plural system programs;
a security chip that checks a validity of the system programs; and
a verification portion that receives a result of the validation of the system programs from the security chip and, when the result is failure, starts inspecting activation states of the system programs, wherein
the verification portion determines that the activation states of the system programs are valid when the failure of the validation at the security chip is caused by a predetermined case in which an activation order of the system programs is changed, and the verification portion determines that the activation states of the system programs are invalid when the failure of the validation at the security chip is caused by a case other than the predetermined case.

2. The information processing device according to claim 1, wherein
the verification portion is pre-stored in a nonvolatile memory which stores BIOS.

3. The information processing device according to claim 1, wherein
the verification portion is provided on a substrate which is equipped with the security chip.

4. The information processing device according to claim 1, wherein the verification portion includes:
an activation-state checking portion that checks the activation states of the system programs;
an activation-state information recording portion that stores information about the activation states of the system programs which has been acquired from the checking of the activation states;
an initial-value recording portion that stores verification-information initial values for to-be-activated system programs; and
a comparison portion that makes a comparison between the information about the activation states of the system programs which is acquired when the system programs are activated and is stored in the activation-state information recording portion and the verification-information initial values which are stored in the initial-value recording portion to inspect the activation states of the system programs.

5. The information processing device according to claim 4, wherein
the security chip pre-stores verification information for use in checking the validity of the system programs, the verification information including an activation key KEY1, a password PS1 for use in outputting the activation key, and certain verification data for use in verification of the system programs,
the verification portion pre-stores a password PS2 identical to the password PS1 for use in outputting the activation key KEY1 in the initial-value recording portion of, and
when the inspection by the comparison portion reveals that the acquired information about the activation states and the verification-information initial values pre-stored in the initial-value recording portion match with each other, the verification portion transmits the pre-stored password PS2 to the security chip, and, when the security chip receives the password PS2, the security chip outputs the pre-stored activation key KEY1 to the verification portion, and, when the verification portion receives the activation key KEY1, the verification portion sends the activation key KEY1 to the system programs.

6. An information processing device, comprising:
a module recording portion that stores plural system programs;
a security chip that checks a validity of the system programs; and
a verification portion that receives a result of the validation of the system programs from the security chip and, when the result is failure, starts inspecting activation states of the system programs, wherein
when the failure of the validation at the security chip is caused by a predetermined case in which an activation order of the system programs is changed, the verification portion determines that the activation states of the system programs are valid and the subsequent activation processing for the system programs is advanced, and
when the failure of the validation at the security chip is caused by a case other than the predetermined case, the verification portion determines that the activation states of the system programs are invalid.

\* \* \* \* \*